(12) United States Patent
Shiga et al.

(10) Patent No.: US 8,138,650 B2
(45) Date of Patent: Mar. 20, 2012

(54) ROTOR CORE HAVING BRIDGES CONNECTION MAGNETIC POLE AND METHOD OF MANUFACTURING THE SAME

(75) Inventors: Tsuyoshi Shiga, Nagoya (JP); Noboru Shibata, Konan (JP)

(73) Assignees: Toshiba Ha Products Co., Ltd., Osaka (JP); Toshiba Consumer Marketing Corporation, Tokyo (JP); Mitsui High-Tec Inc., Kitakyushu (JP)

(*) Notice: Subject to any disclaimer, the term of this patent is extended or adjusted under 35 U.S.C. 154(b) by 500 days.

(21) Appl. No.: 11/596,178

(22) PCT Filed: Apr. 13, 2005

(86) PCT No.: PCT/JP2005/007149
§ 371 (c)(1),
(2), (4) Date: Jun. 24, 2008

(87) PCT Pub. No.: WO2005/112227
PCT Pub. Date: Nov. 24, 2005

(65) Prior Publication Data
US 2008/0252166 A1    Oct. 16, 2008

(30) Foreign Application Priority Data
May 13, 2004    (JP) .................. 2004-143553

(51) Int. Cl.
*H02K 1/27*     (2006.01)
*H02K 15/00*    (2006.01)
*H02K 15/02*    (2006.01)

(52) U.S. Cl. ....... 310/156.53; 310/156.56; 310/216.058; 310/267; 310/266; 29/596; 29/598; 29/607; 29/609

(58) Field of Classification Search ............. 310/156.53, 310/156.56, 156.58, 267, 266; 29/596, 598, 29/607, 609; *H02K 1/27*
See application file for complete search history.

(56) References Cited

U.S. PATENT DOCUMENTS

| 4,469,970 A | | 9/1984 | Neumann |
| 5,369,325 A | * | 11/1994 | Nagate et al. ............. 310/156.54 |
| 5,886,441 A | | 3/1999 | Uchida et al. |
| 5,936,323 A | * | 8/1999 | Shibukawa et al. ....... 310/156.53 |
| 5,990,592 A | * | 11/1999 | Miura et al. ............. 310/156.53 |
| 7,535,147 B2 | * | 5/2009 | Nakahara et al. ......... 310/156.53 |
| 7,583,001 B2 | * | 9/2009 | Lu et al. ................. 310/216.009 |

(Continued)

FOREIGN PATENT DOCUMENTS

JP        07099756    *    4/1995

(Continued)

OTHER PUBLICATIONS

Machine Translation of Hasegawa JP-2001157356.*

(Continued)

*Primary Examiner* — Quyen Leung
*Assistant Examiner* — Terrance Kenerly
(74) *Attorney, Agent, or Firm* — Pillsbury Winthrop Shaw Pittman, LLP

(57) ABSTRACT

A rotor core of a rotating electrical machine formed by stacking a plurality of blanks blanked from a steel sheet, the blank having a yoke, a magnetic pole portion confronting the yoke, and a magnet insertion hole positioned between the yoke and the magnetic pole portion, the magnetic pole portion having a projection projecting circumferentially at two circumferential sides thereof.

8 Claims, 10 Drawing Sheets

U.S. PATENT DOCUMENTS

2006/0113859 A1 * 6/2006 Lu et al. .................. 310/218

FOREIGN PATENT DOCUMENTS

| JP | 08-182282 A | | 7/1996 |
|----|----|----|----|
| JP | 10-225031 A | | 8/1998 |
| JP | 2000060035 | | 2/2000 |
| JP | 2000-116042 A | | 4/2000 |
| JP | 2001157396 | * | 6/2001 |
| JP | 2004254403 | * | 9/2004 |
| KR | 20000016869 | | 9/2000 |
| WO | WO 2004/001930 A1 | | 12/2003 |
| WO | WO2004001930 | * | 12/2003 |

OTHER PUBLICATIONS

Machine translation of Ueda et al., Apr. 1995.*
Korean Office Action dated Dec. 20, 2007 in corresponding foreign application.
European Search Report dated Feb. 9, 2011.
European Search Report dated Jul. 15, 2011.

* cited by examiner

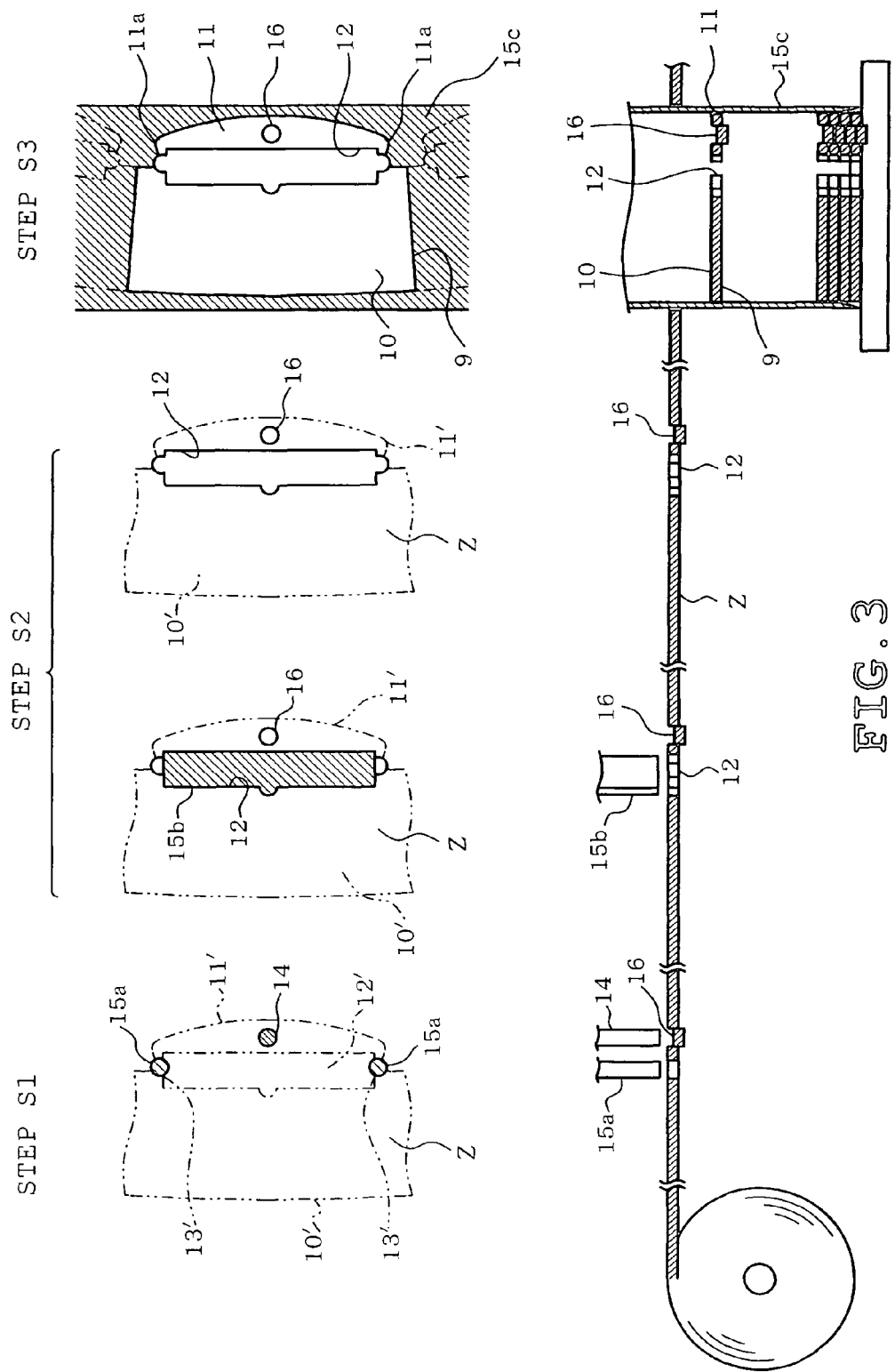

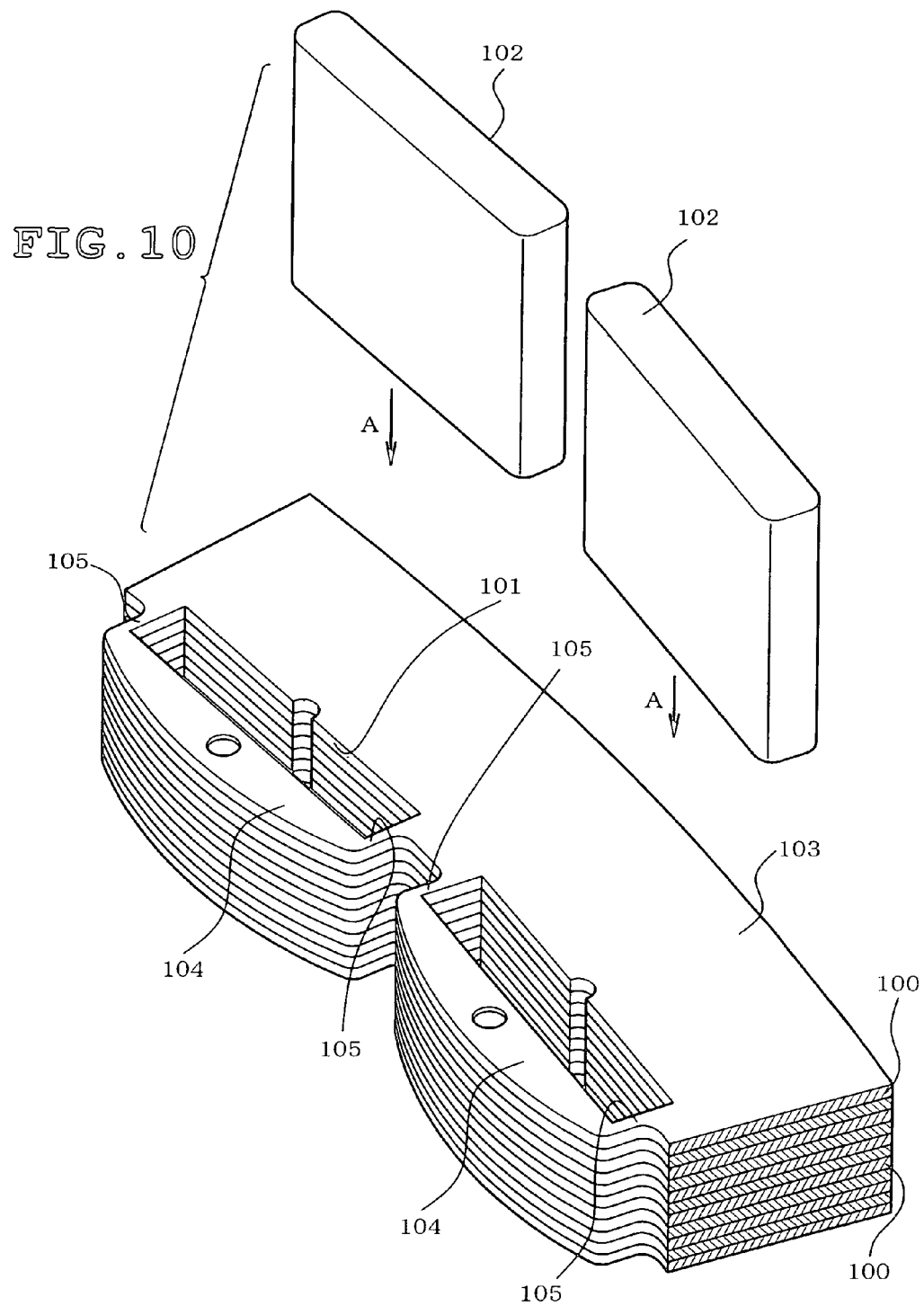

ROTOR CORE HAVING BRIDGES CONNECTION MAGNETIC POLE AND METHOD OF MANUFACTURING THE SAME

This application is a U.S. National Phase Application of PCT/JP2005/007149, filed on Apr. 13, 2005, which relies for priority on, Japanese Patent Application No. 2004-143553, filed on May 13, 2004, the contents of both of which are incorporated herein by reference.

TECHNICAL FIELD

The present invention is directed to a rotor core for a rotating electrical machine formed by stacking a plurality of blanks obtained by blanking a steel sheet for forming a core and a method of manufacturing the same.

BACKGROUND ART

A rotating electrical machine, for example a permanent magnet electric motor (permanent magnet motor) of an outer rotor type, as disclosed in JP-A-H08-182282, includes a substantially cylindrical stator having a slot containing a coil therein and a rotor surrounding the stator via an air gap so as to confront the stator. A plurality of magnetic pole permanent magnets in a circumferential shape is secured along the inner peripheral surface of the rotor by an adhesive, for example, thereby constituting a magnetic pole.

BRIEF SUMMARY OF THE INVENTION

Nd magnet (neodium magnet), SmFe (samarium iron magnet) and the like, are known for their outstanding magnetic characteristics and are thus used as magnetic pole permanent magnets for rotating electrical machines. However, shaping Nd magnets and the like into a circumferential shape is disadvantageous in terms of manufacturing costs. Such being the case, the magnets are generally shaped into rectangular solid.

When using a permanent magnet for a rotor magnetic pole, the permanent magnet needs to be secured to a circumferential rotor yoke. As described above, since the Nd magnets and the like are generally formed as a rectangular solid, they do not conform to the circumferential shape of the yoke and thus cannot be secured by adhesives, and the like. Thus, a method indicated in FIG. 10 is employed for securing the permanent magnets. More specifically, a rotor core is constructed by stacking a plurality of blanks 100 formed by blanking a steel sheet for forming a core at which point a magnet insertion hole is defined thereto. An Nd magnet 102 is secured to the yoke 103 by inserting the Nd magnet 102 to the magnet insertion hole 101 of the rotor core in the direction indicated by arrow A.

The magnet insertion hole 101 taking on a rectangular shape is defined between the yoke 103 extending in the circumferential direction and a magnetic pole portion 104. A bridge 105 connecting the yoke 103 and the magnetic pole portion 104 is formed at the short sides of the magnet insertion hole 101. When the Nd magnet 102 is inserted to the magnet insertion hole 101, a part of magnetic flux which is supposed to be passed from the magnetic pole portion 104 to the air gap is leaked to the yoke 103 side (opposing pole) causing torque reduction and efficiency degradation of the rotating electrical machine.

In order to prevent such characteristic impairment, the width of the bridge 105 may be configured so as to enable magnetic saturation. However such configuration causes the bridge 105 to bend when blanking the yoke 103 and the magnetic pole portion 104 by the blanking blade (not shown) due to the pressure applied to the magnetic pole portion 104 in the direction of the yoke 103. As a result, relative distance between the yoke 103 and the magnetic pole portion 104 becomes displaced, which gives rise to a new problem where the resultant blanks 100 do not satisfy the precision requirement for stacking the blanks 100.

The purpose of the present invention is to provide a rotor core for rotating electrical machine capable of reducing leakage of magnetic flux of the magnet to a possible extent and capable of accurately positioning the yoke and the magnetic pole portion.

The present invention is directed to a rotor core of a rotating electrical machine formed by stacking a plurality of blanks of steel sheet, the blank having a yoke, a magnetic pole portion confronting the yoke, and a magnet insertion hole interposing the yoke and the magnetic pole portion; the magnetic pole portion having a projection projecting circumferentially at two circumferential sides thereof.

The present invention is also directed to a method of manufacturing the rotor core for the rotating electrical machine comprising the steps of forming a caulked portion on a magnetic pole corresponding portion corresponding to the magnetic pole portion of the steel sheet; defining a magnet insertion hole by blanking a portion between a yoke corresponding portion corresponding to the yoke and the magnetic pole corresponding portion; blanking the yoke corresponding portion, the magnetic pole corresponding portion, and a bridge corresponding portion connecting the yoke corresponding portion and the magnetic pole corresponding portion from the steel sheet to form a blank; and stacking a plurality of blanks to form the rotor core.

According to the present invention, the blanks are blanked with the projection of the magnetic pole portion being embraced from longitudinal and lateral directions by the blanking blade. Thus, the yoke and the magnetic pole portion are accurately positioned without the magnetic pole portion being moved toward the yoke. Also, the bridge connecting the yoke and the magnetic pole portion can be configured to a width that enables magnetic saturation, thereby reducing leakage of magnetic flux to a possible extent.

BRIEF DESCRIPTION OF THE DRAWING

FIG. 3 shows a manufacturing step of a blank;

FIG. 10 illustrates a conventional example and corresponds to FIG. 1.

EXPLANATION OF REFERENCE SYMBOLS

Reference symbol 8 designates a rotor core; 9, 9a, 9b, a blank; 10 a yoke; 11 a magnetic pole portion; 11a a projection; 12 a magnet insertion hole; 13 a bridge; 16 a caulked portion; 17 a permanent magnet; and 18 a resin.

DETAILED DESCRIPTION OF THE INVENTION

A first embodiment applying the present invention to a permanent magnet electric motor of an outer rotor type will be described with reference to FIGS. 1 to 8.

Figure 2:
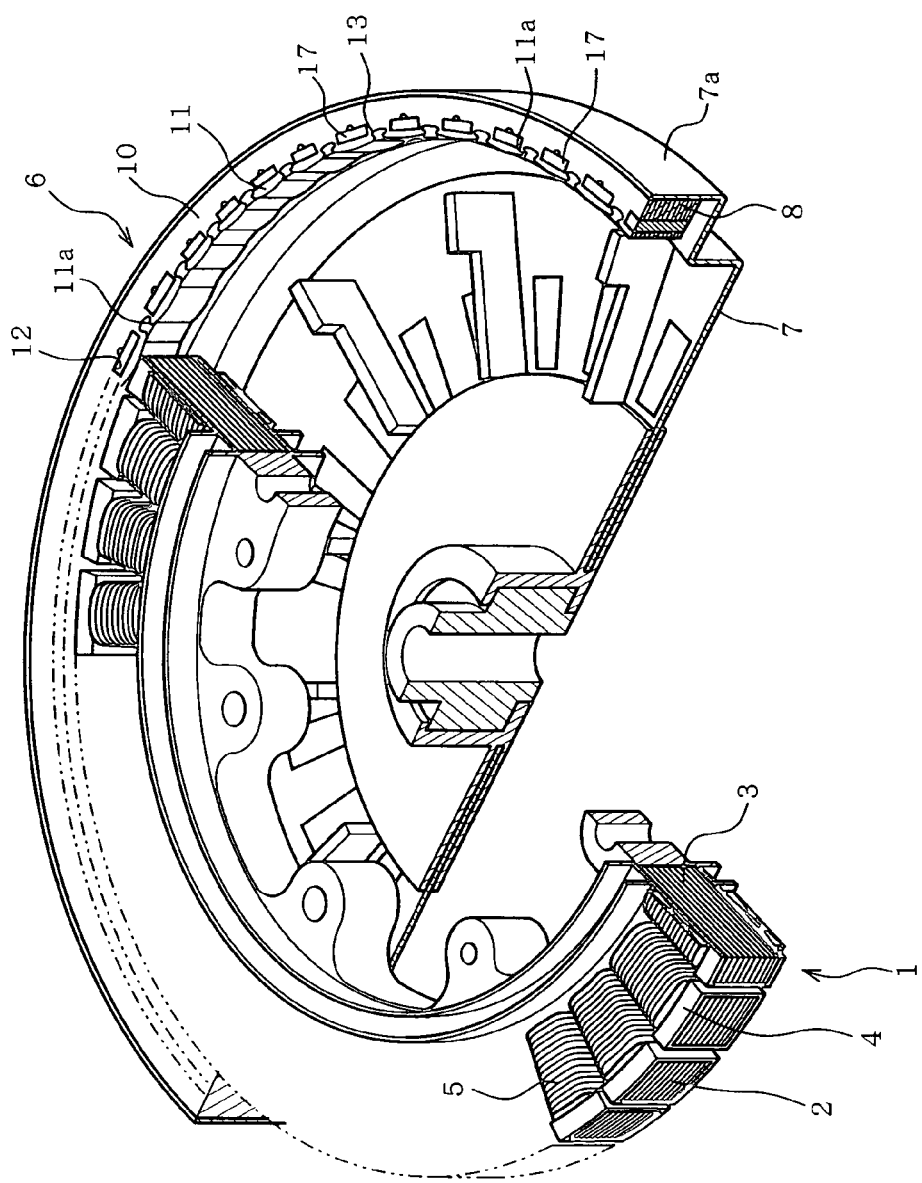
FIG. 2 is a perspective view of a partially broken electric motor.

FIG. 2 illustrates a perspective view of a partially broken electric motor. In FIG. 2, a stator 1 includes a stator core 3 having multiple radial teeth 2, a resin 4 molded so as to cover the stator core 3, and a stator winding 5 wound on each tooth 2.

A rotor 6 has a magnetic frame 7 formed as a cylindrical container with an opened top. An annular wall 7a is provided in the opened side of the outer periphery of the frame 7, and a rotor core 8 is disposed along the inner periphery of the annular wall 7a. The rotor core 8 is formed by stacking a plurality of blanks 9 of steel sheet (electromagnetic steel sheet) Z (refer to FIG. 3). The method of manufacturing the rotor core 8 will be detailed afterwards.

Figure 1:
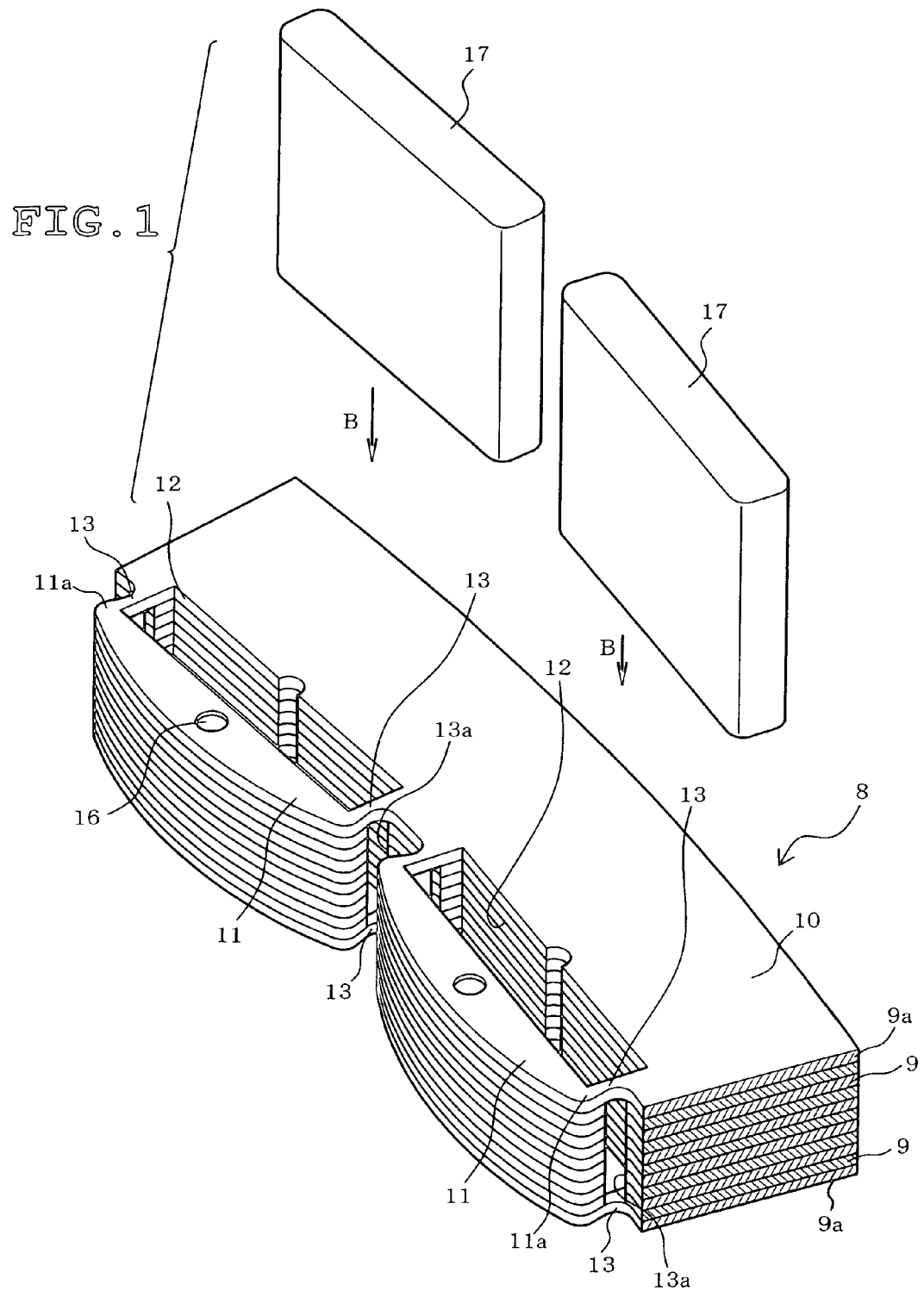
FIG. 1 indicates a first embodiment of the present invention and shows a construction of a rotor core and a method of inserting a magnetic pole permanent magnet.

FIG. 1 illustrates the structure of the rotor core 8 and a method of inserting a permanent magnet 17 for a magnetic pole. The blank 9 has a magnetic pole portion 11 positioned in the inner peripheral side of an annular yoke 10, a rectangular magnetic insertion hole 12 being defined between the yoke 10 and the magnetic pole portion 11. Among the stacked blanks 9, the bottom layer blank 9a initially stacked and the top layer blank 9a lastly stacked have bridges 13 connecting the yoke 10 and the magnetic pole portion 11 formed thereto. On the other hand, the blanks 9 clamped between the bottom layer blank 9a and the top layer blank 9a have their bridges blanked off. Thus, a space 13a with no brides 13 is defined between the top layer blank 9a and the bottom layer blank 9a.

Next, a method of fabricating the blanks 9 and the rotor core 8 will be described with reference to FIGS. 3 to 8.

FIG. 3 illustrates the manufacturing steps of the blanks 9. The upper section of FIG. 3 indicates a series of laterally organized plan views of the steel sheet Z being processed through each manufacturing step, and the lower section indicates side sectional views of the steel sheet (Z) corresponding to the aforementioned plan views. The slashes in the plan views of the steel sheet Z define the schematic shapes of a punch 14 and blanking blades 15a to 15c.

Regarding the blanks 9 with no bridges 13, step S1 identified as a cutting and caulking step is carried out where a roll of steel sheet (electromagnetic sheet) is unrolled and a bridge corresponding portion 13' (bridge 13) is thereafter blanked off from the steel sheet Z by the blanking blade 15a. At the same time, a caulked portion 16 is formed by the punch 14 at a magnetic pole corresponding portion 11' (magnetic pole portion 11). The bridge corresponding portion 13' connects the yoke corresponding portion 10' (yoke 10) and the magnetic pole corresponding portion 11' (magnetic pole portion 11).

After the cutting and caulking step, step S2 identified as an insertion hole blanking step is carried out on the steel plate Z. In the insertion hole blanking step, a rectangular magnet insertion hole 12 is defined by blanking a magnetic pole corresponding portion 12' interposing the yoke corresponding portion 10' and the magnetic pole corresponding portion 11'. The steel sheet Z having been processed in the cutting and caulking step and the insertion hole blanking step has the magnet insertion hole 12 and the caulking portion 16 defined thereto.

Figure 4A:
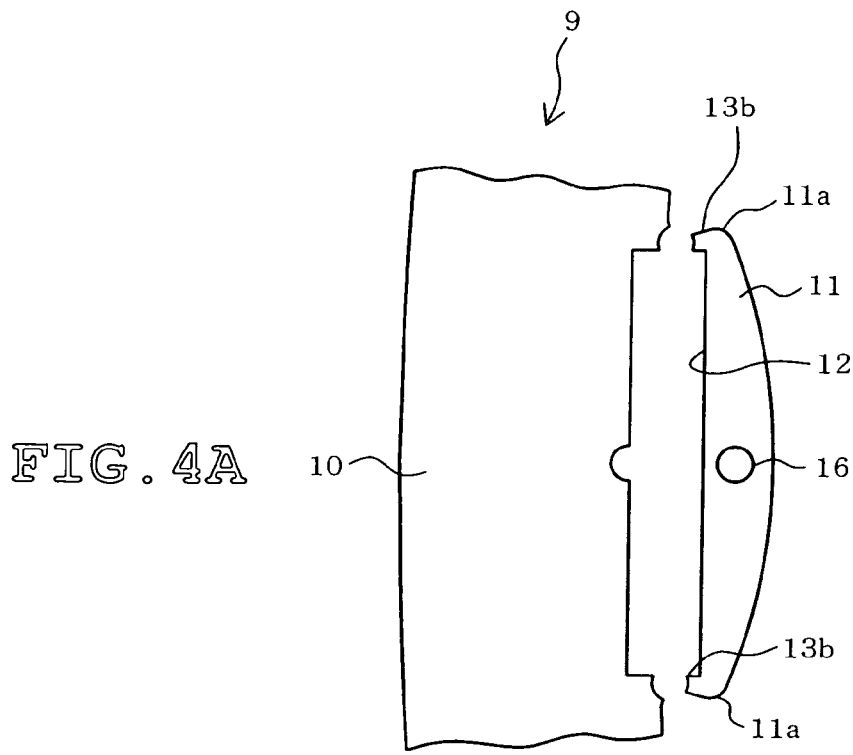
FIG. 4A shows a part of the blank with no bridge between a yoke and a magnetic pole portion.

Thereafter, in step S3 identified as a final blanking step, the yoke corresponding portion 10' (yoke 10) and the magnetic pole corresponding portion 11' (magnetic pole portion 11) is blanked by an annular blanking blade 15c. However, FIG. 3 shows the blanking blade 15c blanking only a part of the annular yoke corresponding portion 10' and the confronting magnetic pole corresponding portion 11' for convenience of illustration. FIG. 4A illustrates the shape of the blank 9. The figure shows the annular yoke 10 and the magnetic pole portion 11 confronting the yoke 10 over the magnetic insertion hole 12. No bridge 13 is provided between the yoke 10 and the magnetic pole portion 11.

Figure 4B:
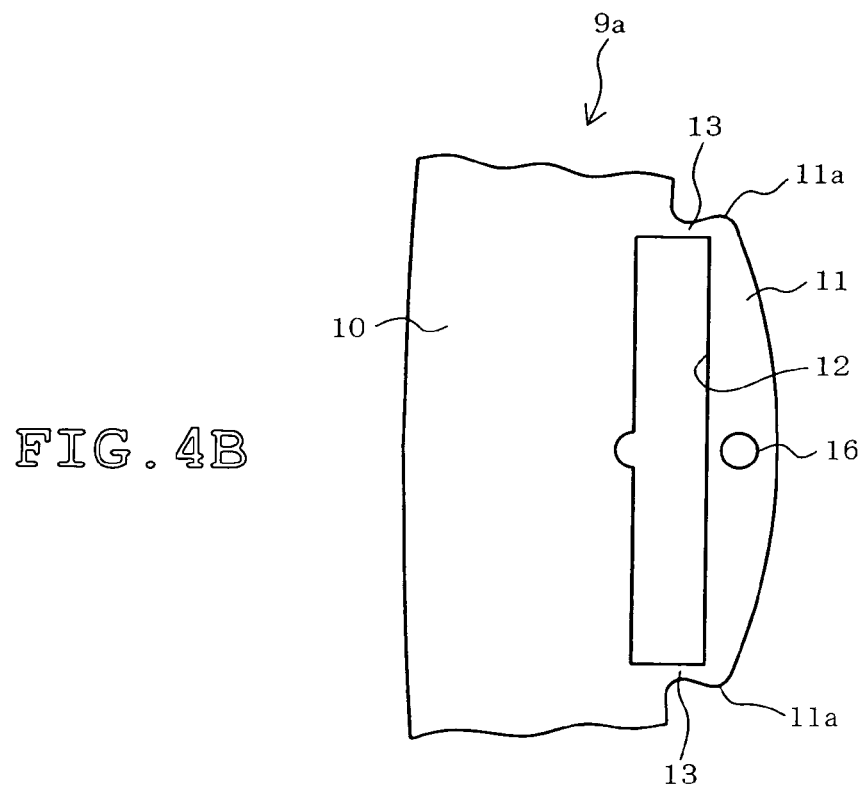
FIG. 4B shows a part of the blank having the bridge connecting the yoke and the magnetic pole portion.

In contrast to the above described blank 9, the bottom and top layer blanks 9a are provided with bridges 13 interposing the yoke 10 and the magnetic pole portion 11. The blanks 9a are formed by replacing the cutting and caulking step of step S1 with a caulking step. That is only the caulking portion 16 is formed in step S1 without cutting the bridge corresponding portion 13' and steps S2 and S3 are carried out thereafter. FIG. 4B illustrates the shape of the blank 9a. The yoke 10 and the magnetic pole portion 11 are connected by the bridge 13.

Figure 5:
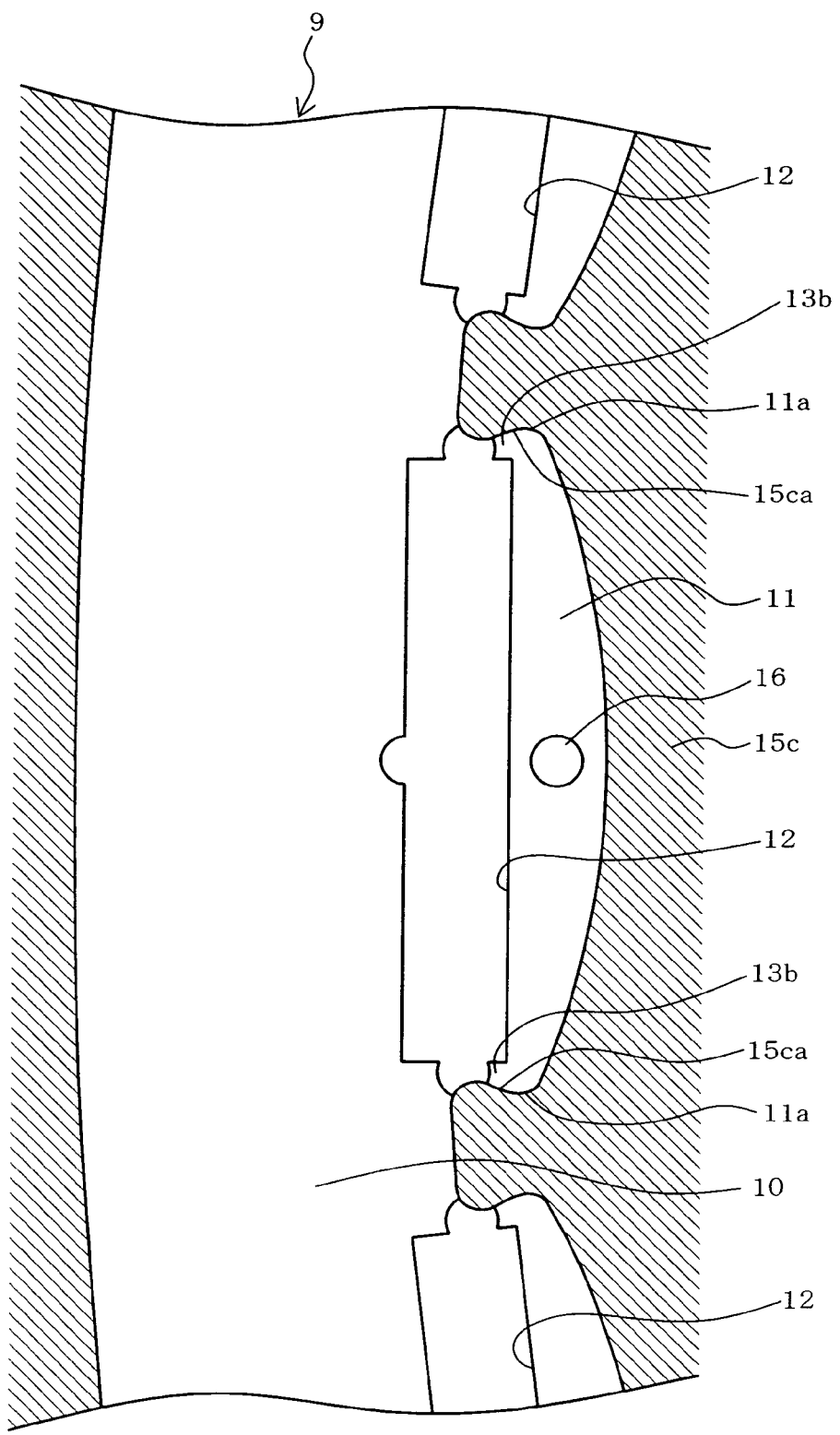
FIG. 5 is a planar illustration of a positioning of the blank and a blanking blade indicated in FIG. 4A in a final blanking step.
Figure 6:
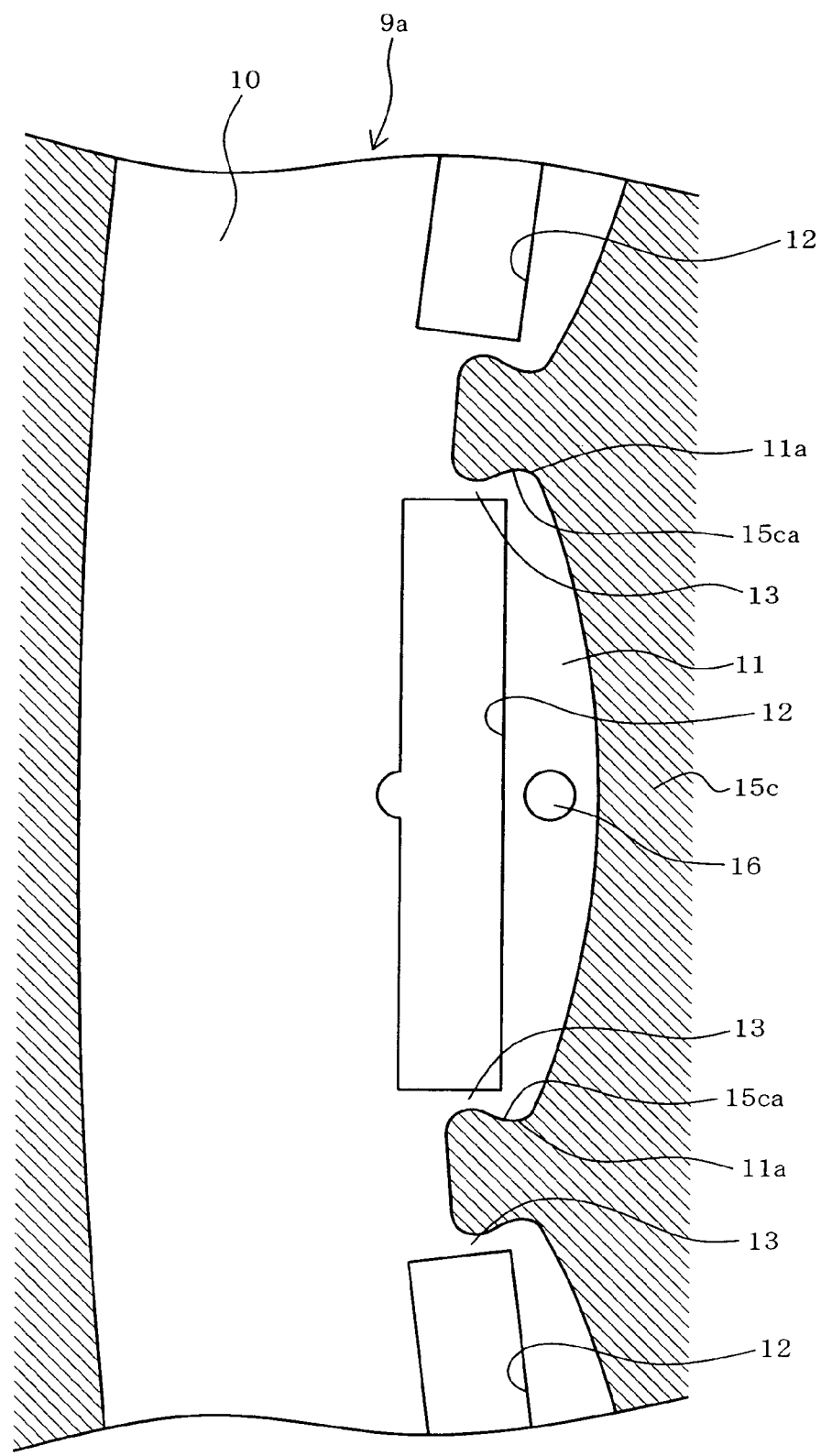
FIG. 6 is a planar illustration of a positioning of the blank and a blanking blade indicated in FIG. 4B in the final blanking step.

FIGS. 5 and 6 are planar illustrations of the positioning of the blanks 9 and 9a relative to the blanking blade 15c. The blanking blade 15c defined by slashes is provided with an embracing portion 15ca at a portion where the magnetic pole portion 11 and the bridge 13 (only a remaining portion 13b is shown in FIG. 5) are formed by blanking. Thus, projections 11a projecting circumferentially relative to the magnetic pole portion 11 is formed integrally on two circumferential sides of the magnetic pole portion 11.

Figure 7:
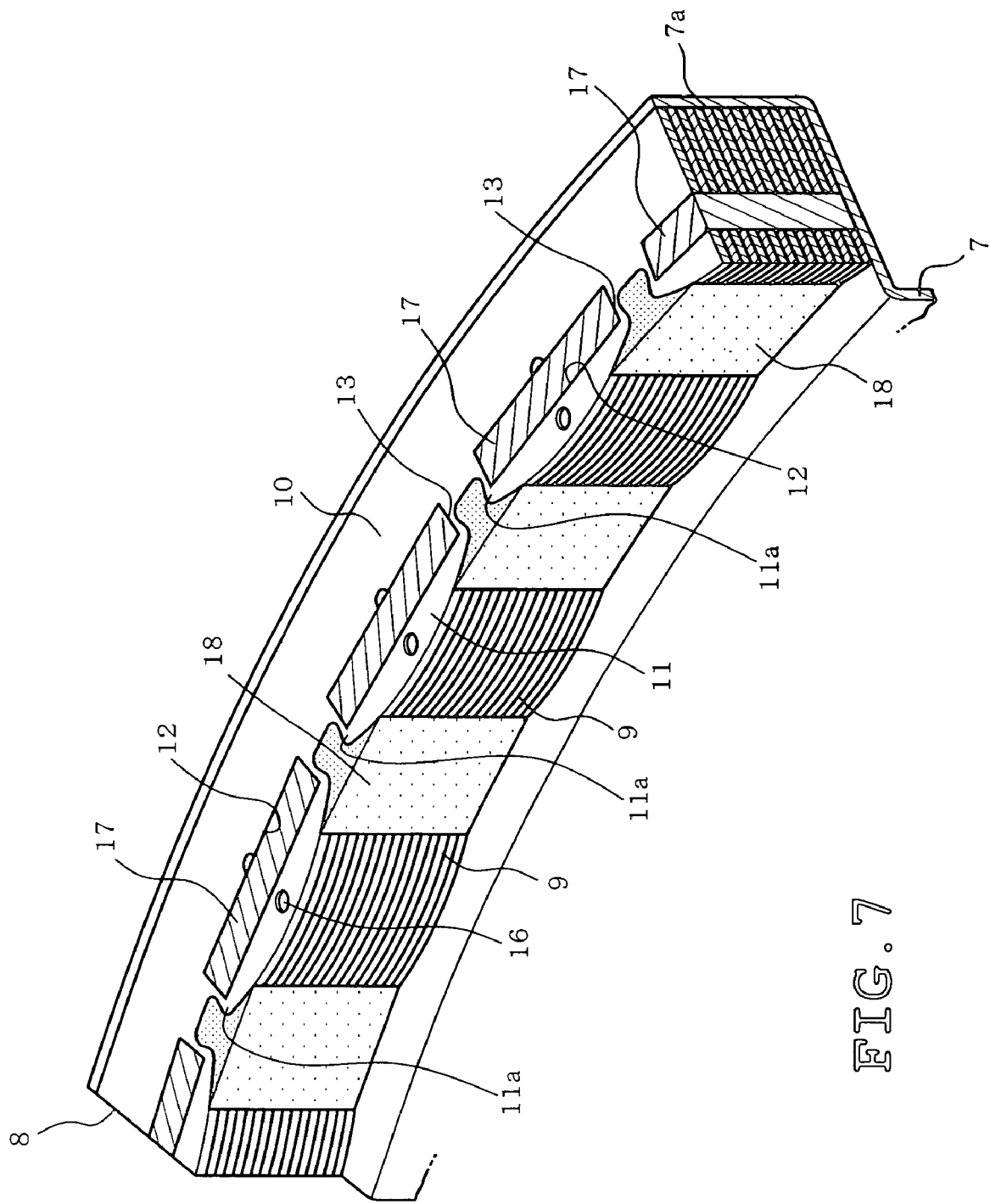
FIG. 7 is a broken perspective view showing an enlarged portion of a rotor.

As described above, after manufacturing the blanks 9 and 9a, the rotor core 8 is formed in step S4 identified as a stacking step by stacking the manufactured blanks 9 and 9a as shown in FIG. 1. As mentioned above, the blank 9a is initially placed at the bottom whereupon blanks 9 are stacked in the intermediate layer and the blank 9a is finally stacked thereupon. Then, the magnetic pole permanent magnet 17, for example an Nd magnet, is inserted to each magnet insertion hole 12 in direction B, in which state, the magnetic poles are molded by resin 18 as illustrated in FIG. 7, thereby forming the rotor 6.

Figure 8:
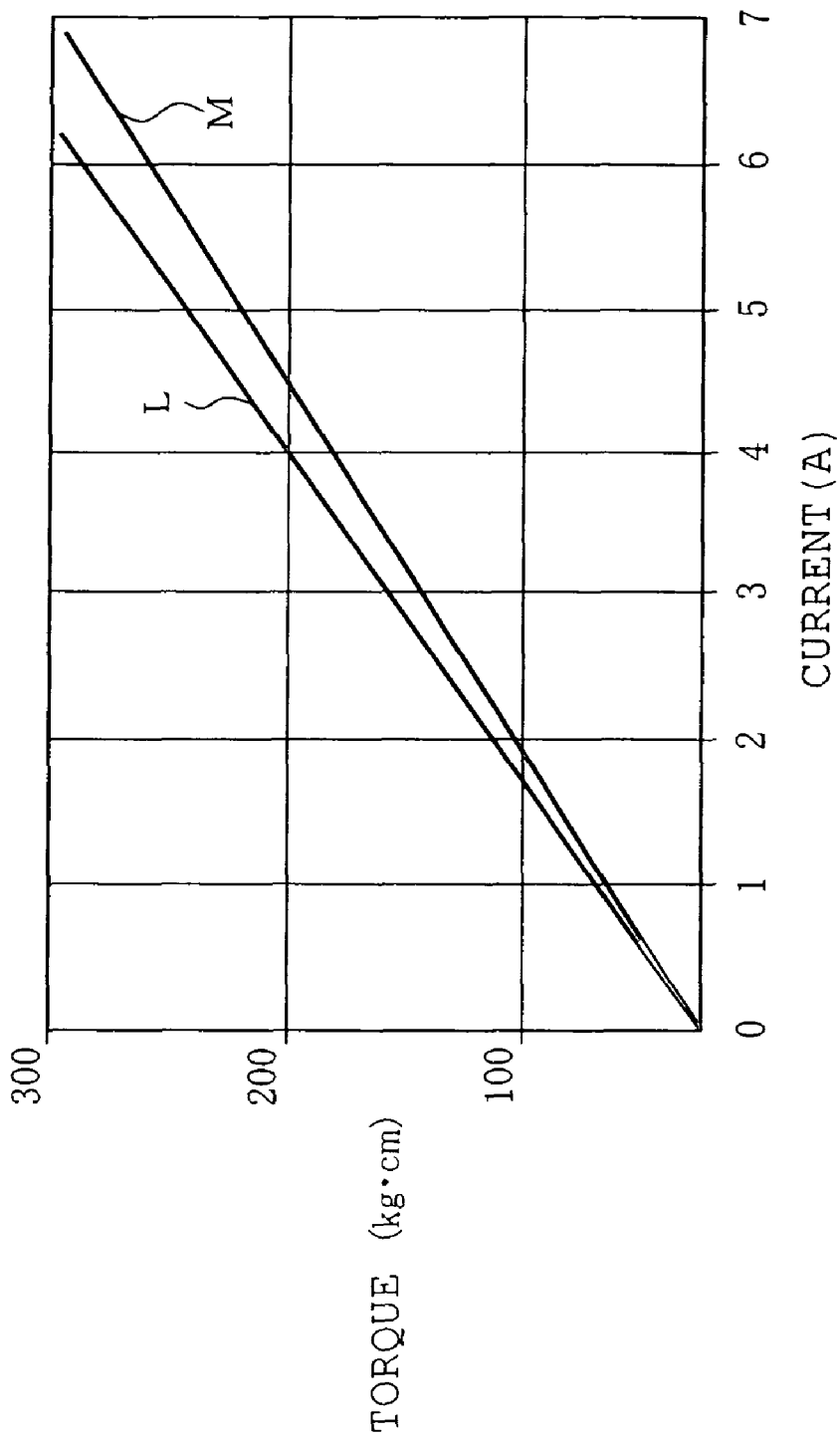
FIG. 8 shows a current-torque characteristic of an electric motor L of the present embodiment and a conventional electric motor M.

Thus, in the rotor core 8 being constructed by stacking blanks 9 and 9a, the bottom and top layer blanks 9a and 9a have bridges 13 connecting the yoke 10 and the magnetic pole portion 11, whereas the blanks 9 in the intermediary layer have no bridges 13. As a result, a space 13a (refer to FIG. 1) is defined at a portion corresponding to the bridges 13 in the intermediary layer with a plurality of blanks 9 caulked and clamped between the two blanks, that is, the top and bottom blanks 9a and 9a. Since the space 13a cuts off the magnetic flux emanating from the permanent magnet 17 inserted to the magnetic insertion hole 12 and extending from the magnetic pole portion 11 to the yoke 10, leakage of magnetic flux from the magnetic pole portion 11 to the yoke 10 via the bridge 13 can be reduced to a considerable extent. Thus, torque reduction and efficiency degradation of the electric motor caused by the leakage of magnetic flux can be prevented to a possible extent. FIG. 8 indicates the current-torque characteristic of an electric motor L of the present embodiment and a conventional electric motor M. The electric motor L of the present embodiment marks higher torque as compared with the conventional electric motor M at any current value, indicating improvement of torque characteristic and consequently the improvement of electric motor efficiency.

In the present embodiment, in manufacturing the blank 9, the bridge corresponding portion 13' is cut in advance in the cutting and caulking step in step S1. Therefore, the magnetic pole portion 11 can be assumed, by nature, to move toward the yoke 10 without any constraints upon application of pressure thereto directed toward the yoke 10 when magnetic pole portion 11 is blanked by the blanking blade 15c in the final blanking step in step S3.

To prevent such case, the projection 11a is formed at the magnetic pole portion 11 in the present embodiment. Thus, as shown in FIG. 5, the embracing portion 15ca of the blanking blade 15c embraces the periphery of the magnetic pole portion 11 of the steel sheet Z from longitudinal and lateral directions. As a result, the magnetic pole portion 11 is constrained and blanked in an unmovable state. Thus, even the blanks 9a without bridges 13 can attain accurate positioning of the magnetic pole portion 11 and the yoke 10, being free from movement of the magnetic pole portion 11 toward the yoke 10 at the time of blanking, thereby providing a blank 9 of high precision.

It is preferable to set the length (projection length) of the projection 11a at the magnetic pole portion 11 in a range of 2 to 10% relative to the circumferential width of each magnetic pole portion 11. If less than 2%, positioning accuracy in embracing the magnetic pole portion 11 with the blanking blade 15c becomes slightly deteriorated, whereas if greater than 10%, leakage of magnetic flux may occur between the magnetic pole portions 11.

Also, in the present embodiment, bridges 13 are maintained for the top and bottom layer blanks 9a, and the blanks 9 without bridges 13 are clamped and caulked by the blanks 9a and 9a of high strengths.

Next, a second embodiment of the present invention will be described with reference to FIG. 9.

Figure 9:
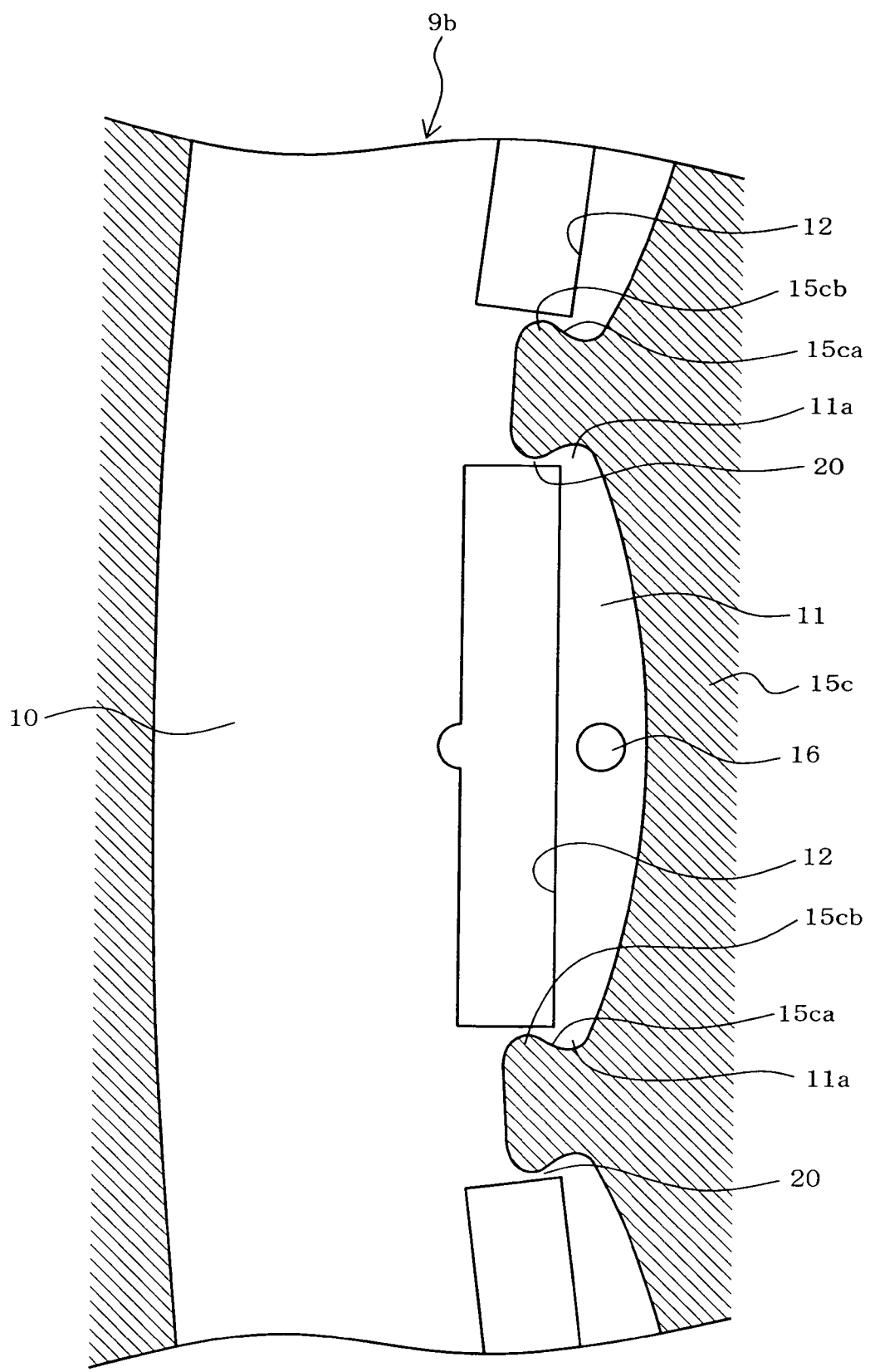
FIG. 9 illustrates a second embodiment and corresponds to FIG. 6.

FIG. 9 is a planar illustration of the positioning of the blank 9b and the blanking blade 15c and portions that are identical to FIG. 6 have been identified with the same reference symbols.

In the manufacturing steps of a blank 9b of the present embodiment, the caulking portion 16 is initially formed in the caulking step of step S1. At this point, the bridge 13 (refer to FIG. 6) is not cut. Then, after the insertion hole blanking step of step S2, the blank 9b is blanked while a bridge 20 is formed by a projection 15cb of the blanking blade 15c in the final blanking step of step S3. In contrast to the bridge 13 illustrated in FIG. 6, the width of the bridge 20 is narrowed to enable magnetic saturation. Thus, in the present embodiment, only the blank 9b is stacked in the stacking step of step S4 to form the rotor core 8.

According to the present embodiment, the magnetic pole portion 11 is blanked in an unmovable state since the embracing portion 15ca of the blanking blade 15c embraces the periphery of the magnetic pole portion 11 of the steel sheet 11 from the longitudinal and lateral directions. Thus, relative distance between the yoke 10 and the magnetic pole portion 11 of the blank 9b can be positioned accurately. Also, leakage of magnetic flux via the bridge 20 can be restrained by magnetic saturation of the bridge 20. Thus, torque reduction and efficiency degradation of the electric motor can be prevented to a possible extent while maintaining the strength of the rotor core 8 to some extent.

The present invention is not limited to the foregoing embodiments but can be modified as follows.

In the stacking step, it is sufficient to stack at least one blank 9a having a bridge 13 connecting the yoke 10 and the magnetic pole portion 11. In case of applying a single blank 9a, it is preferable to arrange such blank 9a in the substantial mid portion of the stack and caulk and secure other blanks 9 based on the blank 9a. Such construction provides rotor core 8 having a high overall strength. Also, since the cross sectional area of the bridge 13 is reduced by one layer, magnetic flux leakage can be reduced by one layer. As a result, torque reduction and efficiency degradation can be reliably prevented. The same effect can be obtained by placing the blank 9a having the bridge 13 in any place of the stack.

The magnetic pole permanent magnet 17 may be a SmFe magnet (samarium iron magnet), or the like.

As described above, a rotor core for a rotating electrical machine and the method of manufacturing the same in accordance with the present invention is applicable to a permanent magnet electric motor of an outer rotor or inner rotor type.

The invention claimed is:

1. A rotor for a rotating electrical machine comprising:
a rotor core made of a stack of a plurality of blanks of steel sheet including a yoke, a magnetic pole portion confronting the yoke, and a magnet insertion hole interposed between the yoke and the magnetic pole portion, wherein the stack includes at least one blank having a bridge connecting the yoke and the magnetic pole portion and one or more blanks having the bridge blanked off, and
a magnet inserted to the magnet insertion hole,
wherein a projection is configured to project circumferentially beyond a width of the bridge and is formed at two circumferential sides of the magnetic pole portion and;
wherein a resin is molded between the magnetic pole portions and within a space of the stack of blanks defined by the blanked off bridge of the rotor core with the magnet being inserted to the magnet insertion hole.

2. The rotor of claim 1, wherein the blank stacked at an uppermost layer and a lowermost layer include the bridge.

3. The rotor of claim 1, wherein a length of projection of the projection ranges from 2 to 10% relative to a circumferential length of each magnetic pole portion.

4. A method of manufacturing a rotor of a rotating electrical machine including a rotor core made of a stack of a plurality of blanks including a yoke, a magnetic pole portion confronting the yoke, a magnet insertion hole interposed between the yoke and the magnetic pole portion, a magnet inserted into the magnet insertion hole, the method comprising:
forming a caulked portion in a magnetic pole corresponding portion that corresponds to the magnetic pole of a steel sheet for forming a core;
defining a magnet insertion hole by blanking a portion between a yoke corresponding portion that corresponds to the yoke and the magnetic pole corresponding portion of the steel sheet;
blanking the yoke corresponding portion, the magnetic pole corresponding portion, and a bridge corresponding portion that connects the yoke corresponding portion and the magnetic pole corresponding portion from the steel sheet to form blanks;
stacking the plurality of blanks to form the rotor core,
inserting the magnet into the magnet insertion hole of the rotor core; and
molding a resin between the magnetic pole portions and within a space of the stack of blanks defined by the blanked off bridge of the rotor core with the magnet being inserted to the magnet insertion hole,
wherein the blanking forms a projection projecting circumferentially beyond a width of the bridge at two circumferential sides of the magnetic pole portion by blanking the magnetic pole corresponding portion.

5. The method of claim 4, wherein a length of projection of the projection ranges from 2 to 10% relative to a circumferential length of each magnetic pole portion.

6. A method of manufacturing a rotor of a rotating electrical machine including a rotor core made of a stack of a plurality of blanks including a yoke, a magnetic pole portion confronting the yoke, a magnet insertion hole that is interposed between the yoke and the magnetic pole portion, a magnet inserted into the magnet insertion hole, the method comprising:
- cutting a bridge corresponding portion connecting a yoke corresponding portion that corresponds to the yoke and a magnetic pole corresponding portion that corresponds to the magnetic pole portion and forming a caulked portion in the magnetic pole corresponding portion of a steel sheet for forming a core;
- defining a magnet insertion hole by blanking a portion between the yoke corresponding portion and the magnetic pole corresponding portion of the steel sheet;
- blanking the yoke and the magnetic pole portion from the steel sheet to form a blank; and
- stacking a plurality of blanks to form the rotor core;
- inserting a magnet into the magnet insertion hole of the rotor core; and
- molding a resin between the magnetic pole portions and within a space of the stack of blanks defined by the blanked off bridge of the rotor core with the magnet being inserted to the magnet insertion hole;
- wherein the blanking forms a projection projecting circumferentially beyond a width of the bridge at two circumferential sides of the magnetic pole portion by blanking the magnetic pole portion and
- wherein the stacked blanks include at least one blank having a bridge connecting the yoke and the magnetic pole portion.

7. The method of claim 6, wherein the blanks stacked initially and lastly have a bridge connecting the yoke and the magnetic pole portion.

8. The method of claim 6, wherein a length of the projection ranges from 2 to 10% relative to a circumferential length of each magnetic pole portion.

* * * * *